Patented Dec. 26, 1933

1,941,261

UNITED STATES PATENT OFFICE 1,941,261

MILK PRODUCT AND THE MANUFACTURE THEREOF

Ragnvald Hellerud, Oslo, Norway

No Drawing. Application April 23, 1930, Serial No. 446,781, and in Great Britain October 5, 1929

9 Claims. (Cl. 99—11)

This invention relates to an improved process for the manufacture and preservation of that class of milk products in which milk is mixed with vegetable fats.

It has been proposed to manufacture such products by injecting the fat in a very fine state of subdivision into the milk, but there is a tendency for the fat to separate out on standing, and if this occurs it greatly depreciates the commercial value of the product. To overcome this it has been proposed to homogenize the mixture, but such homogenization by known methods has invariably deteriorated the whipping qualities of the cream produced.

The object of the present invention is to produce a product in which this tendency is prevented or substantially reduced, and by it synthetic cream can be produced which can be preserved for long periods without separation of the fat, and which with a proper proportion of fat whips well, and will under certain conditions give an increase in volume of one hundred per cent, or more on such whipping, and maintains such increased volume for a considerable period.

Another object is to enable the viscosity of the product to be varied within suitable limits. Furthermore such product has an agreeable taste which very greatly resembles that of natural cream.

The principal feature of the invention is that the milk and vegetable fat are intimately mixed with the addition of water soluble proteins contained in egg yolk, or of such yolk itself, and are then heated and homogenized at a temperature which is between 70° and 90° C.

Another feature of the invention is that this homogenization is preferably performed in two stages. According to the preferred method the first of such stages is at a high pressure i. e. over 100 atmospheres, and in the second the pressure is lower, in order to reduce the viscosity of the product. By varying the second pressure a different degree of viscosity can be produced i. e. the less such second pressure the lower the viscosity. This may be effected either by passing the mixture twice through an homogenizer or through separate homogenizers or a two-valve homogenizer.

By a variant of this part of the invention a comparatively low pressure, say 25 atmospheres, can be used for the homogenization, provided that the process is repeated, and although the mixture is not as intimate as with high pressure homogenization, the product will preserve its qualities for a considerable period.

To obtain the objects of this invention the presence of the water soluble proteins of egg yolk is essential, lecithine having little or no effect in stabilizing the mixture, and it is further essential that the homogenization should be performed at or above a critical temperature. The effect of this critical temperature is apparently to produce a change of the water soluble proteins from the dissolved to the colloidal state, but the minimum temperature necessarily depends somewhat on the quality and condition of the milk. With normal milk in the condition in which it is drawn from a cow a temperature of 70° is usually sufficient, but if the mucus is withdrawn, as is usual with modern dairy methods, a higher temperature, of usually about 74° C. is necessary. The exact critical temperature can in any case be determined by testing a sample and seeing whether it possesses the necessary qualities of stability, but in case of doubt a temperature of 74° C. or over can be employed in all cases, in fact any temperature up to about 90° C.

The best results have been found to be achieved by raising the temperature of the product to about 85° C. and it may then be allowed to cool somewhat before homogenization.

The high temperature homogenization above referred to has other advantages, in that it enables the product to be subjected, without deterioration, to a further process which greatly improves its keeping qualities. This further process consists in two or more pasteurizations of comparatively long duration, say one hour at temperatures which may vary between 63° and 80° C., with an interval or intervals between sufficient, and if under conditions favourable for the development of any spores present e. g. an interval of 24 hours at 40° C.

The mixing may be performed by spraying, preferably with a nozzle not greater than .4 mm. in diameter, and at comparatively high pressures say 130 atmospheres or over, but a satisfactory product can be obtained by intimately mixing in a mechanical mixer.

Where the spraying process is adopted it is preferable to inject the fat into the milk, and to add the emulsifying agent to the milk before spraying.

It has been found that the best fat for this purpose is earth nut oil hardened until its melting point is about 32° C.

The temperature at which the mixing can be performed may be varied within considerable limits, but should not be lower than 40° C. In practice it has been found that the best results are achieved by heating the milk to about 60° C. and the fat to about 65° C.

It is to be understood that the object of this invention is to produce a synthetic cream rich in fat i. e. containing not less than twenty per cent of fat. Either natural milk or skimmed milk can be used, so long as the total fat contents of the product are brought to the desired point.

The following description of one method of preparation of a product according to the present invention is given by way of example only, and it must be clearly understood that such invention is not confined to a process comprising all the steps therein described, nor to the substances, times, quantities, pressures or temperatures therein set out.

To one hundred gallons of fresh unskimmed milk are added 15 lbs. of dried egg yolk and 8 lbs. of fresh egg yolk. This is preferably effected by taking 8 to 10 gallons of the milk and stirring in the eggs, and then adding this mixture to the bulk of the milk. The whole of the 100 gallons of milk is then preferably passed through an homogenizer to obtain a more intimate mixture. These processes may be performed at room temperature—say about 15° C.

The mixture is then heated to about 60° C. e. g. by passing through a pasteurizer and at this temperature there is injected 590 lbs. of earth nut fat hardened so as to give a melting point of about 32° C. which has been heated to 60° C. This is effected through nozzles of say .3 mm. diameter at a pressure which may vary between wide limits, e. g. from 100 to 250 atmospheres.

The temperature of the product is then raised to about 85° C., then allowed to cool somewhat and the whole is passed through a two valve homogenizer at a temperature of about 74° C. The pressure at the entry of the first valve being 130 atmospheres and the pressure at the second 70 atmospheres.

On leaving the homogenizer the product is cooled preferably to about 2° C. and left for 24 hours at this temperature.

The product is then ready for use, but to increase its preservative properties it may be subjected to pasteurization in an air tight container for one hour at about 70° C. It may then be kept in the container for a day at 40° C., and the following day subjected to a further pasteurization similar to the first and after another day's interval to a third.

As a variant the temperature of 40° C. may only be applied for a portion of each 24 hours— say 4 to 5 hours—the product being kept at air temperature for the remaining time.

If water soluble proteins are added e. g. the residue after the extraction of the yolk with ether and chloroform instead of the whole yolk of egg approximately one kilogramme of extract per hundred litres of milk should be used. The milk should be fresh and preferably the acidity should not exceed 8 Soxlet Henkel.

It is to be understood that the term milk used in the claims hereof is intended to cover either unskimmed or skimmed milk.

What I claim is:—

1. A process for the manufacture of a synthetic milk product rich in fat which comprises intimately mixing milk and a vegetable fat together with an emulsifying agent containing water soluble proteins derived from egg yolk, heating the product and homogenizing the same at a temperature between 70° and 90° C.

2. A process for the manufacture of a synthetic milk product of high fat content which comprises intimately mixing milk and earth nut oil hardened to a melting point of approximately 32° C. together with water soluble proteins derived from egg yolk, heating the product and homogenizing the same at a temperature between 70° and 90° C.

3. A process for the manufacture of a synthetic milk product rich in fat which comprises intimately mixing milk and a vegetable fat together with an emulsifying agent consisting of egg yolk, heating the product and homogenizing the same at a temperature between 70° and 90° C.

4. A process of making a synthetic food product rich in fat which comprises mixing milk with an emulsifying agent containing water soluble proteins from egg yolk, injecting vegetable fat into the mixture while this is at a temperature of between 40° to 65° C., heating the product and homogenizing the same at a temperature of between 70° and 90° C.

5. That step in the process according to claim 4 which consists in performing the injection at a pressure of at least 130 atmospheres and through a nozzle not greater than .4 mm. in diameter.

6. A process for the manufacture of a synthetic milk product rich in fat which comprises intimately mixing milk and a vegetable fat together with an emulsifying agent containing water soluble proteins derived from egg yolk, heating the product and homogenizing the same at a temperature between 70° and 90° C. in two stages, the first of which is at a pressure greater than 100 atmospheres and the second at a pressure of less than 100 atmospheres.

7. A process for the manufacture of a synthetic milk product rich in fat which comprises intimately mixing milk and a vegetable fat together with an emulsifying agent containing water soluble proteins derived from egg yolk, heating the product and homogenizing the same at a temperature between 70° and 90° C. in two stages, both at a pressure below 100 atmospheres.

8. A process for the manufacture of a synthetic milk product rich in fat which comprises intimately mixing milk and a vegetable fat together with an emulsifying agent containing water soluble proteins derived from egg yolk, heating the product and homogenizing the same at a temperature between 70° and 90° C. in two stages, the first of which is at a pressure greater than 100 atmospheres and the second at a pressure of less than 100 atmospheres the said homogenization being carried out in a two valve homogenizer whereby a violent stirring and high emulsification of the mixture is realized.

9. That step in the process according to claim 1 which consists in cooling the product after homogenization to a temperature of approximately 2° C. and keeping it at such temperature for about 24 hours.

RAGNVALD HELLERUD.